(12) United States Patent
VanKuiken

(10) Patent No.: US 7,419,417 B1
(45) Date of Patent: Sep. 2, 2008

(54) YO-YO WITH DOUBLE BEARING SYSTEM

(76) Inventor: Jack C. VanKuiken, 2244 Ridgewood Rd., Lisle, IL (US) 60532

( * ) Notice: Subject to any disclaimer, the term of this patent is extended or adjusted under 35 U.S.C. 154(b) by 351 days.

(21) Appl. No.: 11/346,144

(22) Filed: Feb. 2, 2006

(51) Int. Cl.
*A63H 1/30* (2006.01)
(52) U.S. Cl. ...................................... 446/250
(58) Field of Classification Search ................ 446/250, 446/251, 252, 255
See application file for complete search history.

(56) References Cited

U.S. PATENT DOCUMENTS

| | | | |
|---|---|---|---|
| 3,175,326 A | | 3/1965 | Isaacson |
| 5,468,073 A | * | 11/1995 | Willacy ...................... 384/477 |
| 6,004,183 A | * | 12/1999 | Dixon et al. ................ 446/250 |
| 6,565,408 B1 | | 5/2003 | Marcantonio et al. |
| 6,637,817 B1 | * | 10/2003 | Christopher et al. ..... 297/284.4 |

OTHER PUBLICATIONS

Lubricants 101, 8 pages, found at http://theyo.com/messageboard/viewtopic.php?t=12121&view=next&sid=cd7aa9d66867.

Description of the Dif-e- Yo *KonKave* Bearing, 2 pages, found on Sep. 30, 2005 at http://www.dif-e-yo.com/konkave.htm.
American Yo-Yo Society, 5's Ceramic Bearing Information, 2 pages at http://www.ayya.org/ceramic.php.
Donald W. Watson, Yo-Yo Physics, An Engineer's Notebook, Mechanics and Gyroscopics, Monograph IV in a Series, pp. 26-31, Pencil Point Press, 2001.

* cited by examiner

*Primary Examiner*—Kien Nguyen
(74) *Attorney, Agent, or Firm*—Philip H. Kier

(57) ABSTRACT

A yo-yo with an axle having two side-by-side bearings constituting a double bearing that enhances yo-yo performance characteristics by improving balance and reducing unwanted effects such as wobble, tilting, twisting, vibration, and string friction. Each bearing having an outer ring, an inner ring, and an array of balls trapped in tracks between the two rings. The outer rings of the bearings may be beveled to form a groove to enhance stability and centering of a string. Alternatively, the bearings may be covered with a bridge that has a straight outer surface or has an outer surface with a groove that could take several shapes. The bridge may have an internal ridge that acts as a centering mechanism for the bearing and bridge assembly. The inner and outer rings of the bearings may be independent or shared, and the rings of one bearing may overlap the rings of the other bearing. The inner rings of the bearings may be extended outward to provide spacing between bearing parts and yo-yo side walls.

29 Claims, 7 Drawing Sheets

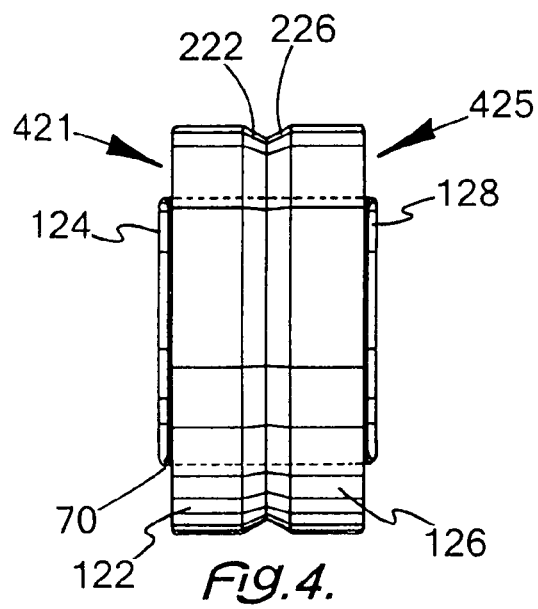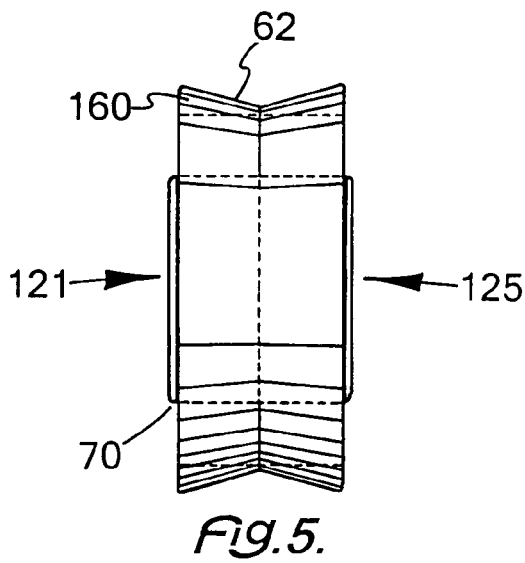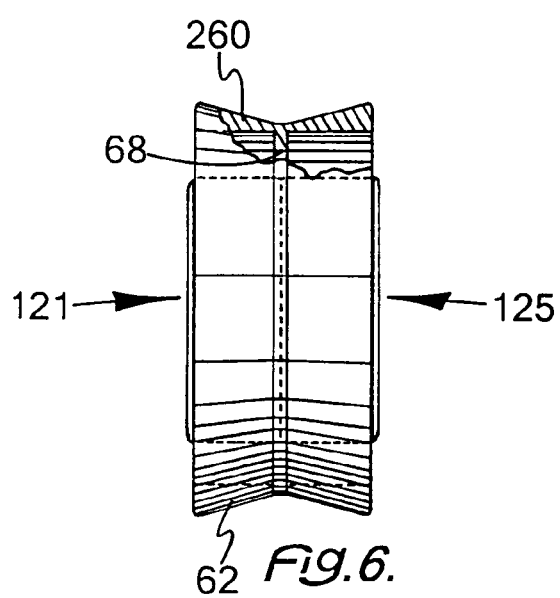

YO-YO WITH DOUBLE BEARING SYSTEM

BACKGROUND OF THE INVENTION

This invention pertains to bearings for yo-yos. More particularly, it pertains to a double bearing, essentially two distinct bearings located side-by-side, positioned around the axle of a yo-yo to provide friction reduction and string centering that improves on the performance of a yo-yo with a single bearing.

Single bearings have been employed in yo-yos for approximately forty years and they dramatically reduce friction created between string and yo-yo parts during rapid spins of the yo-yo and during various tricks performed while the yo-yo is spinning. An early use of a ball bearing is taught by Isaacson in U.S. Pat. No. 3,175,326. A recent use of a roller bearing is taught by Marcantonio in U.S. Pat. No. 6,565,408 B1. Such single bearings are located at the midpoint of the axle around which the yo-yo spins between the string gap and the axle. Friction reduction allows the yo-yo to spin more rapidly and for a greater variety of tricks to be performed.

Although single bearings reduce friction, they still have several drawbacks. They are limited in terms of widths that are practically feasible and are available as stock items. Wide bearings can be important for avoiding friction between the string and the inner walls of the yo-yo and can also be important for performing advanced tricks. Also, single bearings used in yo-yos have bearing balls contained within two rings, an outer ring and an inner ring. A yo-yo string is wrapped around the outer ring of the bearing. In launching: a yo-yo, when the yo-yo reaches the bottom of a throw, the string abruptly pulls against the outer ring of the bearing, and introduces angular "tilting" or "wiggle" of the outer ring relative to the yo-yo's axle owing to clearances needed for individual bearing balls that must be free to roll around semi-circular internal grooves (referred to here as "tracks") in the inner and outer rings that help contain the bearing balls between the rings. This wiggle or tilting of the outer bearing ring causes the string to slide off center and contact edges of yo-yo walls, thus imparting extra undesired friction that reduces spin time, and consequently reduces the time to perform tricks or to enjoy free-spinning suspension of yo-yo on the string. Wiggle of the outer bearing ring also gives rise to vibration and wiggle of the overall yo-yo.

Recently, improvements have been made in single bearing yo-yos. These include ceramic bearings with ceramic bearing balls, instead of the usual stainless steel bearing components, that reduce friction within the bearing itself[1]; curved outer rings that help keep the string centered, thus reducing friction with yo-yo walls such as the KonKave[2] bearing; and different types of lubricants[3] other than the previous standards such as grease or mineral oil. New lubricants such as light petroleum, synthetic oils, and Teflon-enriched oils are designed to reduce the internal yo-yo friction to extend spin times. However, in spite of these improvements, single bearing yo-yos are still subject to: angular tilting of the outer bearing ring; string friction with the walls of the yo-yo; and overall yo-yo vibration, wobbling, and "precession." Precession refers to a well-known phenomena where the entire yo-yo tilts and twists during a spin as it slows down owing to forces of friction. As discussed by Watson[4] precession is caused by frictional forces generated at various points within a yo-yo, including forces within a bearing (between the balls and track), and friction between the string and other moving parts of the yo-yo. The direction of the tilting or twisting depends on where the friction occurs relative to the axis of spin. The inertia and gyroscopic action of a fast spinning yo-yo resists precession, but as a yo-yo slows, the tilting and twisting become more pronounced. The effects of precession significantly shorten the useful duration of a spinning yo-yo.

The double bearing system disclosed here provides significant improvements over previous yo-yo bearing systems. The double bearing system, located between string and axle, provides two points of balance for the yo-yo instead of one. These two points of balance are located laterally outside the string position so that the string applies pressure to the bearing within the spacing between the two tracks of bearing balls. This position means the throwing force is distributed and balanced between two sets of bearing balls instead of being unstably balanced over a single track of bearing balls, and as a result there is a significant reduction in angular tilting of the outer ring for a double bearing as compared with a single bearing. Furthermore, the double bearing design significantly reduces precession effects for the yo-yo. Because the axle has two points of suspension instead of one, angular torque that typically causes precession has much less effect on a double bearing yo-yo. The result is much improved stability in vertical and horizontal orientation, meaning that there is less tilting and twisting.

SUMMARY OF THE INVENTION

The invention is a double bearing system for use in a yo-yo with an axle, two symmetrical half bodies positioned at opposite ends of the axle, and a gap separating the half bodies within which string is wound. The string generally consists of a twisted pair of multi-filament strands beginning at a top loop (which can be anchored to a player's hand) extending downward to, and looping around, the yo-yo bearing, and returning via the twisted pair back to the top loop. In the simplest embodiment, there are two bearings side-by-side whose outer rings are beveled slightly so that together the outer rings form a shallow V-shaped groove. The string will tend to position itself at this groove that is centered between, and recessed from the walls of the yo-yo thereby reducing friction. A double bearing combined with a V-shaped centering groove is more effective in balancing a yo-yo and centering the string away from the walls of the yo-yo than a conventional single bearing, and also more effective than a single bearing with a curvilinear groove (such as implemented in Ref. 2), and thus provides enhanced wobble/vibration reduction, stability improvements, and friction reduction. The double bearing system may have an outer "bridge" that spans the two bearings, and that bridge may have a groove, which may have several shapes to suit different players preferences and to facilitate different kinds of tricks. The groove in a bridge not only helps center a primary string loop (where it loops around the bearing), but also centers additional layers of string that are captured within the yo-yo walls during advanced string tricks. The bridge also serves to avoid the possibility of string getting wedged between narrow gaps that can develop between two outer bearing rings when bearings are simply positioned side-by-side.

A double bearing system is inherently wider than a single bearing system because of the extra track of balls. For example, a standard 10 mm (0.39 in.) outer diameter (O.D.) bearing with an inner diameter (I.D.) of 6 mm (0.24 in.) is typically available as a stock item with a width of approximately 3 mm (0.12 in.), and not all of that width is usable because a portion of the bearing needs to be recessed into the inner walls of the yo-yo to prevent the string from slipping off the bearing. A double bearing with the same 10 mm O.D. yields a width of 6 mm (0.24 in.). This extra width is an advantage for advanced players, as it allows greater choices for string gaps, and wider gaps allow more layers of string to be captured during tricks without interfering with sustained spin times. Advanced string tricks can require catching two, three, four or more layers of string within the inner walls of the yo-yo, so most advanced players prefer string gaps of 3 mm (0.12 in.) and wider, which is near the limit or exceeds the width of many single bearings. The limited width of the string gap for single bearing systems thereby poses limits to the number of string layers and the range of tricks that can be performed. The string gap for double bearing systems can be widened to most any practical limit for which a player can throw and retrieve the resulting yo-yo.

BRIEF DESCRIPTION OF THE SEVERAL VIEWS

FIG. 4 is a view of a double bearing system with beveled outer rings.

FIG. 5 is a view of a double bearing system with a bridge with a V-shaped outer surface.

FIG. 6 is a view of an assembled double bearing system with a bridge with a V-shaped outer surface and an internal ridge.

DETAILED DESCRIPTION OF THE INVENTION

Figure 1:
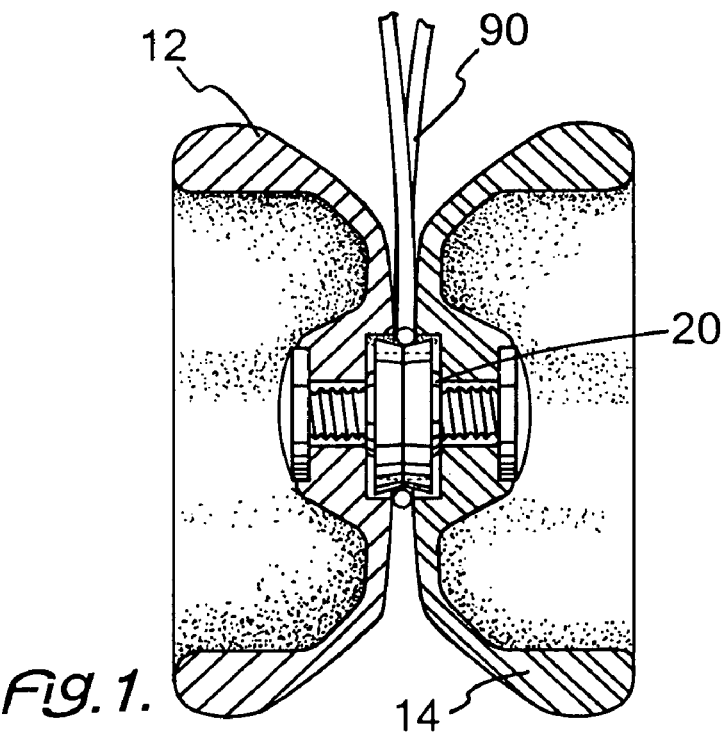
FIG. 1 is a side, cross sectional view of an assembled yo-yo with a double-bearing system.
Figure 1A:
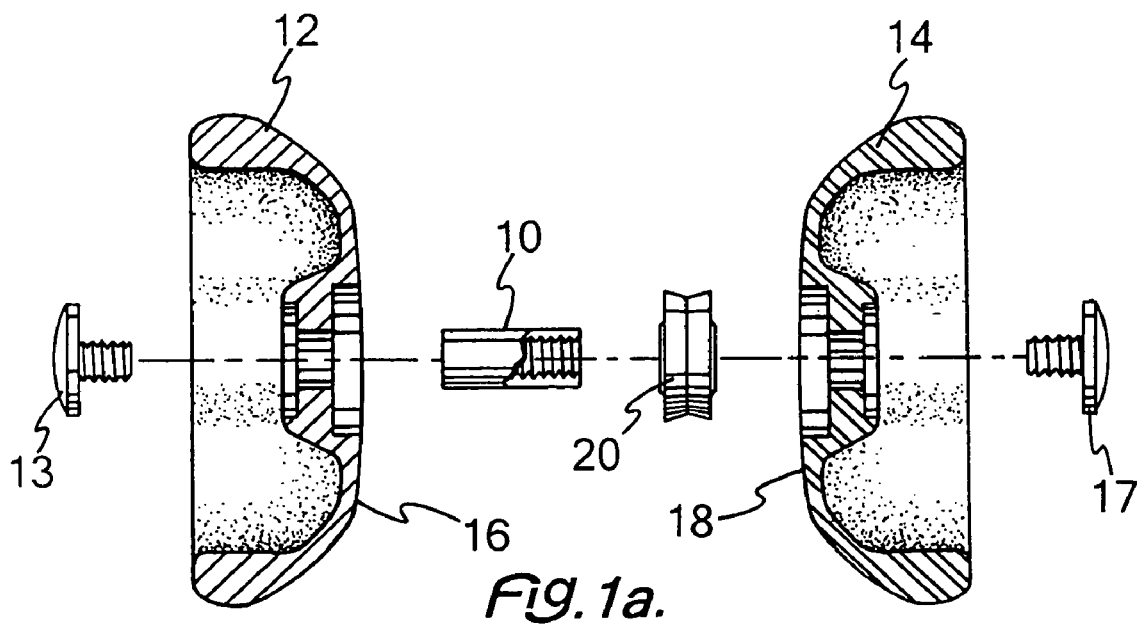
FIG. 1a is a side, cross sectional view of an unassembled yo-yo with a double-bearing system.
Figure 2:
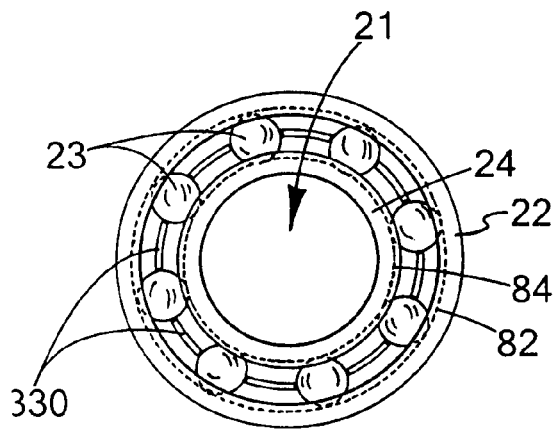
FIG. 2 is a side view of a bearing showing the inner ring, the outer ring, and the bearing balls.
Figure 2A:
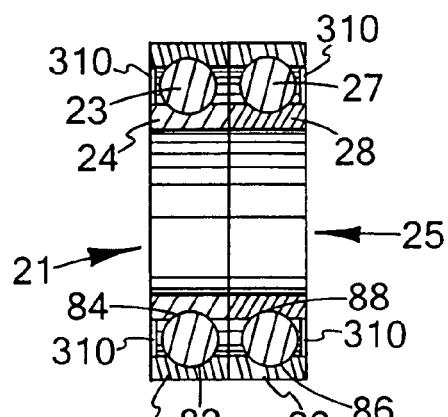
FIG. 2a is a cross sectional view of a double bearing system with each bearing having its independent inner ring and outer ring.

FIGS. 1 and 1a show a basic double bearing system in a yo-yo. There is an axle 10 and half body 12 with inner wall 16 and half body 14 with inner wall 18 positioned at opposite ends of the axle. Double bearing system 20 is positioned around axle 10 at or near its midpoint. Screws 13 and 17 thread into the axle to provide compression of the half bodies against the double bearing. Tightening the screws, by rotating the half bodies clockwise, secures the yo-yo parts for play. Inner walls 16 and 18 and the outer radial surface of the double bearing system define a gap for string 90. FIG. 2 shows a basic bearing 21 with outer ring 22, outer track 82, balls 23, inner ring 24 and inner track 84. FIG. 2a shows a double bearing system where, in addition to bearing 21 there is bearing 25 with outer ring 26, outer track 86, balls 27, inner ring 28, and inner track 88, the bearings being side-by-side, flush against each other. Axle 10 passes through the "bore" (i.e., I.D. of inner rings) of the bearings. Although the drawings and the specifications refer to the rolling elements in a bearing as being spherical balls, they could also be cylindrical rollers.

Bearings may include shields located in the lateral gaps between inner and outer rings. The purpose of these shields is to prevent dust, dirt, and other debris from entering internal areas of the bearing, including the tracks. Such debris can potentially introduce unwanted friction and can interfere with free spinning out the outer ring relative to the inner ring. When included, shields 310 are located laterally to either side of the bearing balls as shown in FIG. 2a. To simplify the remaining drawings, shields have not been depicted in the other drawings, but in general would be included as part of the preferred embodiments for the invention. When included, shields would be located on the outward facing sides of any of the double bearings shown in FIGS. 1-8. They are functionally useful, but not required for this invention. Furthermore, most bearings used in yo-yos also include a small cage 330, as shown in FIG. 2. The purpose of the cage is to maintain equal spacing of the bearing balls as they rotate around the track, so that they do not collide or bunch up at various points around the track. The cage rotates around the track along with the bearing balls. As with the shields, cages are not depicted in drawings other than FIG. 2 so that the drawings may illustrate more clearly other functional aspects and design configurations.

Figure 2B:
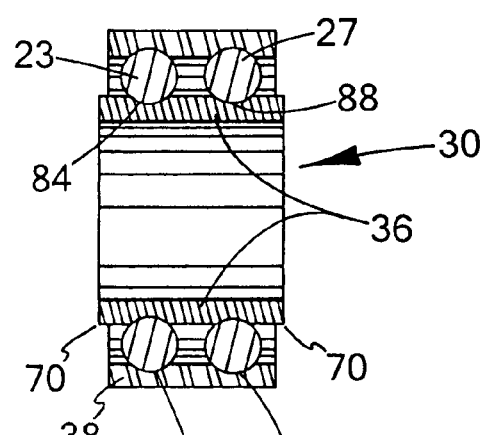
FIG. 2b is a cross sectional view of a double bearing system with one shared inner ring and one shared outer ring.

The components of bearings need not be all independent. FIG. 2b shows a double bearing system 30 with two tracks of balls, with a shared inner ring 36 and with a shared outer ring 38. While the bearing in FIG. 2b has an outward appearance resembling that of a single bearing, it still provides the benefits of a double bearing, such as improved balance and reduced wobble.

Figure 2C:
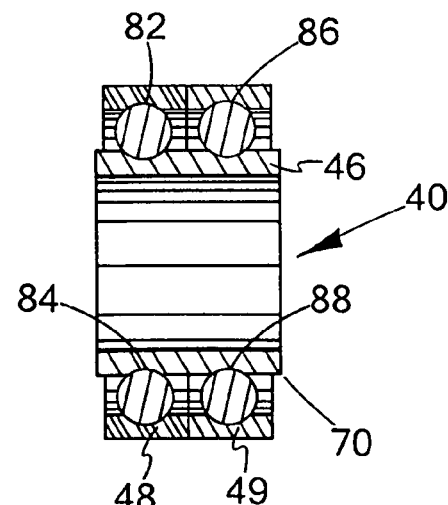
FIG. 2c is a cross sectional view of a double bearing system with one shared inner ring and two independent outer rings.
Figure 2D:
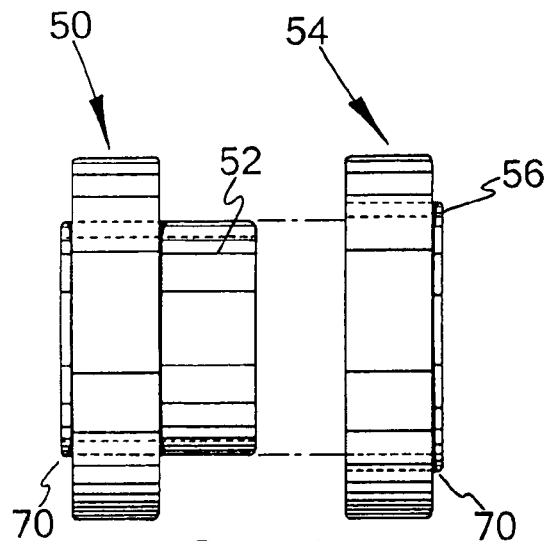
FIG. 2d shows a view of an unassembled double bearing system with one bearing having an extended inner ring that fits within the inner ring of the second bearing.
Figure 2E:
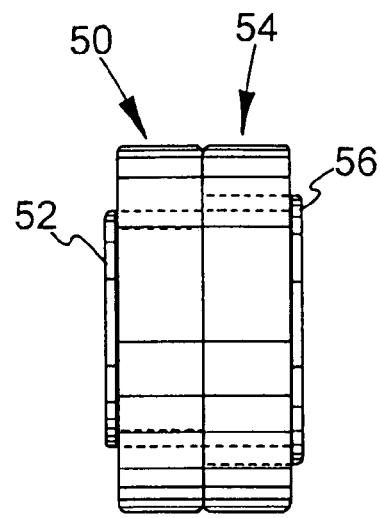
FIG. 2e shows a view of the assembled double bearing system with one bearing having an extended inner ring that fits within the inner ring of the second bearing.
Figure 2F:
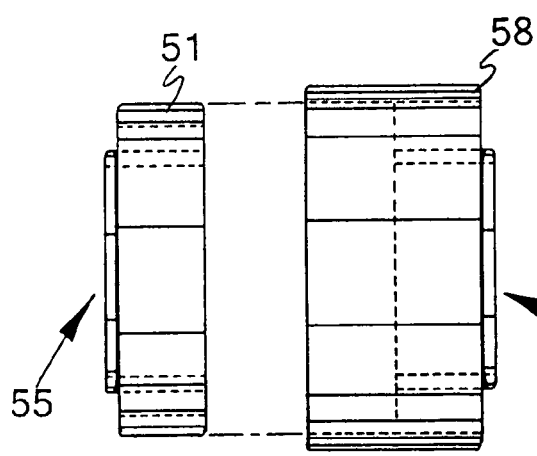
FIG. 2f shows a view of an unassembled double bearing system with one bearing having an outer ring that fits within an extended outer ring of the second bearing.
Figure 2G:
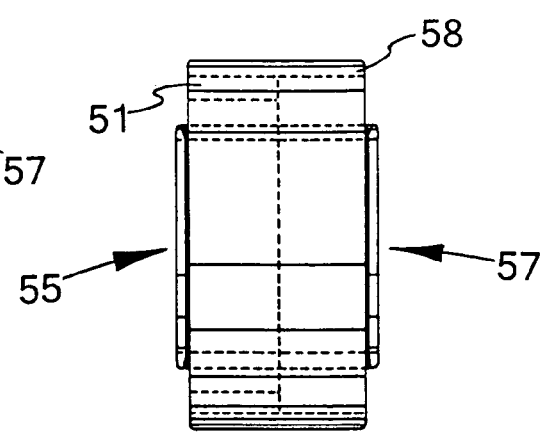
FIG. 2g shows a view of the assembled double bearing system with one bearing having an outer ring that fits within an extended outer ring of the second bearing.
Figure 2H:
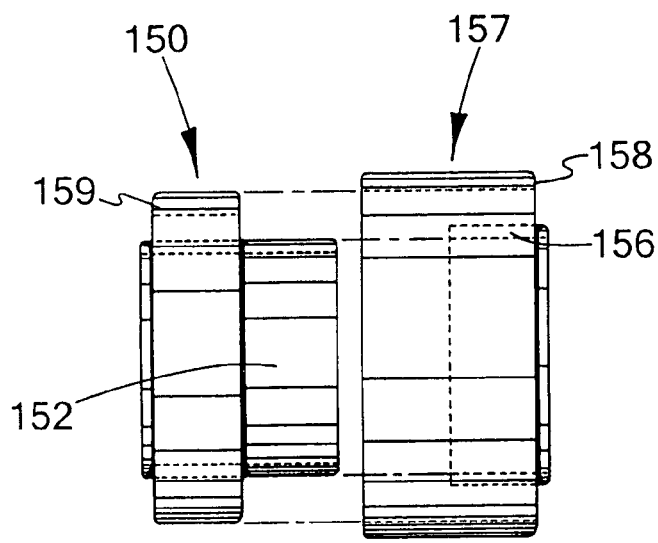
FIG. 2h shows a view of an unassembled double bearing system with one bearing having an extended inner ring and an outer ring that both fit within the respective inner ring and extended outer ring of the second bearing.
Figure 2I:
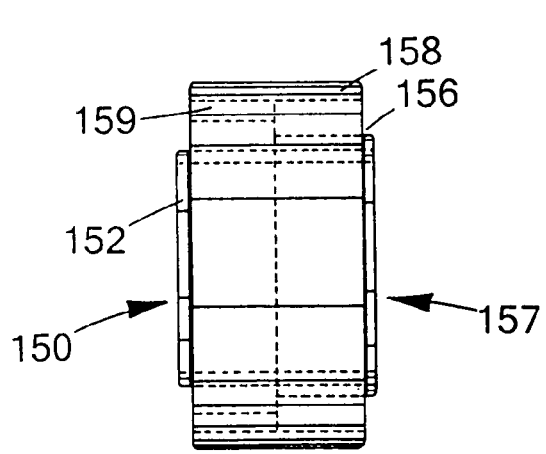
FIG. 2i shows a view of the assembled double bearing system with one bearing having an extended inner ring and an outer ring that both fit within the respective inner ring and extended outer ring of the second bearing.

It is preferred that the inner ring or rings have short outward lateral extensions 70 so that the inner ring, or rings, extend outwardly beyond the outer ring(s). These extensions act to space the bearings relative to the inner walls 16 and 18 of the yo-yo half bodies 12 and 14 so that outer portions of the bearings rotate freely relative to the inner walls and do not touch the inner walls. With the exception of FIG. 2a, the double bearings shown in FIGS. 1 through 8 have extensions. Another bearing configuration is shown in FIG. 2c. Here the double bearing system 40 has a shared inner ring 46, and two independent outer rings 48 and 49. In FIGS. 2d and 2e bearing 50 has an asymmetrically extended inner ring 52 and bearing 54 has an inner ring 56 with an inner diameter that is slightly larger than the outer diameter of inner ring 52. This allows extended inner ring 52 to slip within inner ring 56 when the yo-yo is assembled. In the double bearing system shown in FIGS. 2f and 2g the outer diameter of the outer ring 51 of bearing 55 is smaller than the inner diameter of extended outer ring 58 of bearing 57. This allows bearing 55 to slip within the outer ring of bearing 57. In FIGS. 2h and 2i bearing 150 has an asymmetrically extended inner ring 152 and bearing 157 has an inner ring 156 with an inner diameter that is slightly larger than the outer diameter of inner ring 152. In addition, bearing 150 also has an outer diameter of the outer ring 159 that is smaller than the inner diameter of asymmetrically extended outer ring 158 of bearing 157. This allows both rings of bearing 150 to slip within the respective rings of bearing 157.

Figure 3:
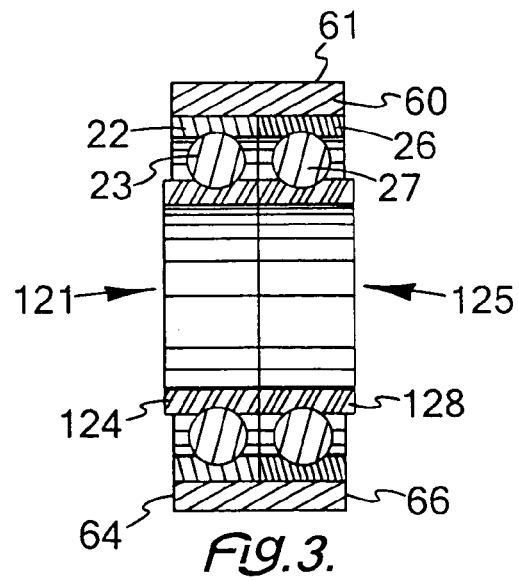
FIG. 3 is view of a double bearing system with a bridge with a straight outer surface.

The outer rings are typically cylindrical and may form a straight continuous surface when side-by-side. The bearings in this embodiment may be off-the-shelf bearings such as model No. 1060 (10 mm outer diameter and 6 mm inner diameter). To avoid the possibility of the string getting wedged between the two side-by-side outer rings, the double bearings can be contained within a bridge that spans the two bearings. In its simplest embodiment as shown in FIG. 3, the bridge 60 has straight cylindrical outer surface 61 and lateral surfaces 64 and 66 that are open to allow insertion of bearings 121 and 125, and passage of axle 10. This embodiment, in which inner rings 124 and 128 are outwardly extended, captures some, but not all, of the performance improvement potential of a double bearing system that is described above.

An embodiment with the capabilities that were described in the Summary is shown in FIG. 4. In this embodiment, outer rings 122 and 126 have beveled edges 222 and 226 such that when bearings 421 and 425 are placed flush against each other side-by-side, the outer rings form a narrow V-shaped groove. The same capabilities that the embodiment with beveled outer rings can be achieved more securely with standard bearings contained within a bridge 160 that has a shallow V-shaped outer surface 62 as shown in FIG. 5. Various shapes and sizes of double bearing systems can be adopted for different types of yo-yos (e.g., looping vs string trick yo-yos), and different types of bridges can be coupled with the double bearing systems to enhance performance. In addition there are several mechanisms for attaching and securing the bridge.

Figure 6A:
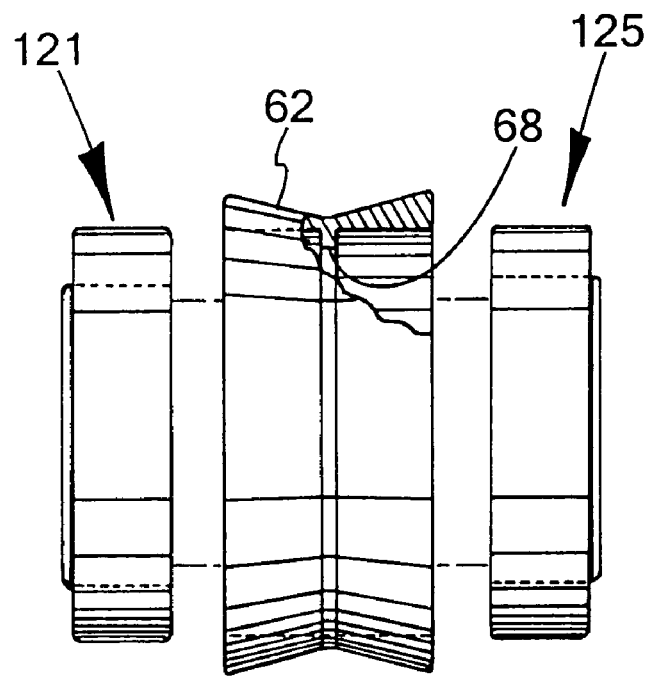
FIG. 6a is a view of an unassembled double bearing system with a bridge with a V-shaped outer surface and an internal ridge.

FIGS. 6 and 6a show the components of a double bearing system with a bridge wherein the means of positioning the bearings relative to the bridge is a short centering annular ridge 68 along the center of the inner surface of bridge 260. This ridge ensures that when the bearings are placed in the bridge and pressed together in a screw-compression axle/bearing configuration, they are symmetrically positioned relative to the deepest apex of the V-shaped outer surface 62 of bridge 260. Another alternative is a friction fit between the bridge and the bearings by press-fitting the bearings into the bridge. Other means to secure the bearings to the bridge include glue, set screws, and pin-punch settings. Yet another means to secure the bridge is by using flanged bearings that have external radial ridges on the outer lateral edges of the outer rings. The flanges effectively capture and center a bridge positioned between the two flanged bearings.

Figure 7A:
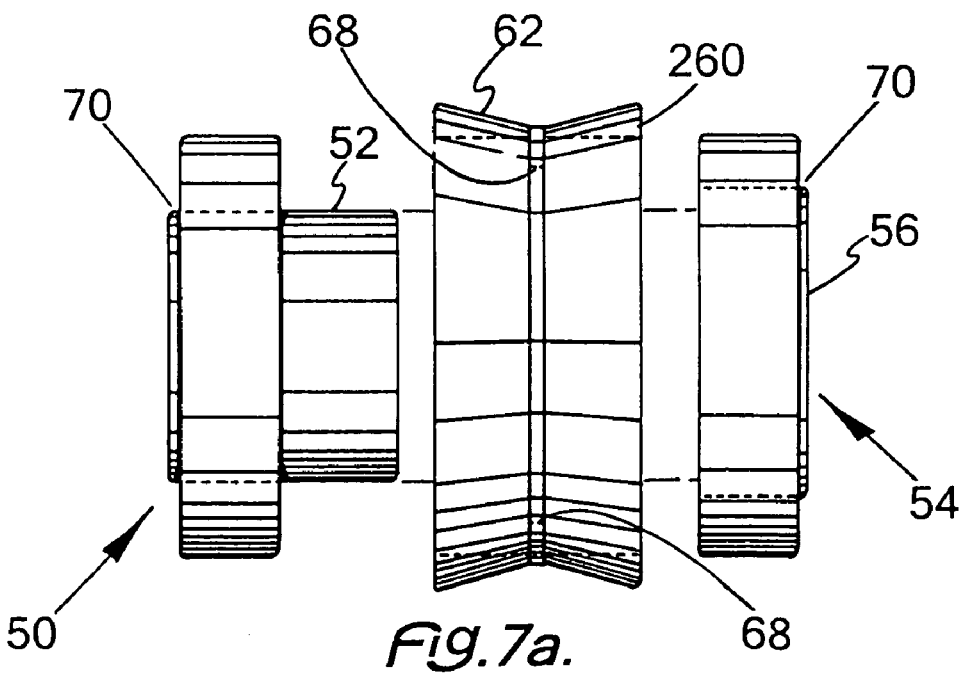
FIG. 7a shows a view of an unassembled double bearing system with one bearing having an extended inner that fits within the inner ring of the second bearing and with a bridge with a V-shaped outer surface and an internal centering ridge.
Figure 7B:
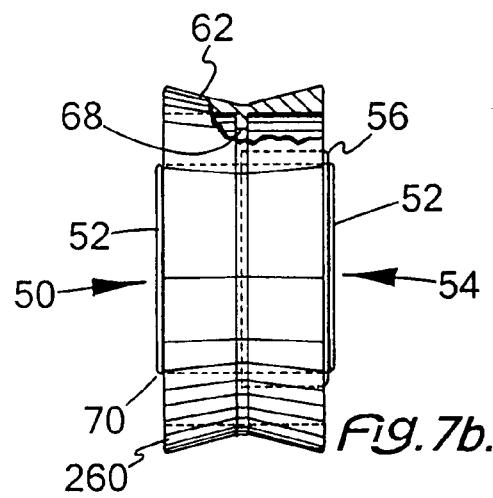
FIG. 7b shows a view of the assembled double bearing system with one bearing having an extended inner ring that fits within the inner ring of the second bearing and with a bridge with a V-shaped outer surface and an internal centering ridge.

FIG. 7a shows an unassembled view of the preferred embodiment where bearing 50 has an asymmetrically extended inner ring 52 and bearing 54 has an inner ring 56 with an inner diameter that is slightly larger than the outer diameter of inner ring 52. This embodiment also includes a bridge 260 with centering annular ridge 68 and lateral inner ring extensions 70 beyond the widths of the outer rings and the bridge, to ensure that the outer rings and bridge do not touch the inner walls of the yo-yo. FIG. 7b shows this embodiment as assembled into a composite bearing assembly that provides all of the double bearing performance enhancements, and also favorable tolerance considerations for manufacturing.

Figure 8A:
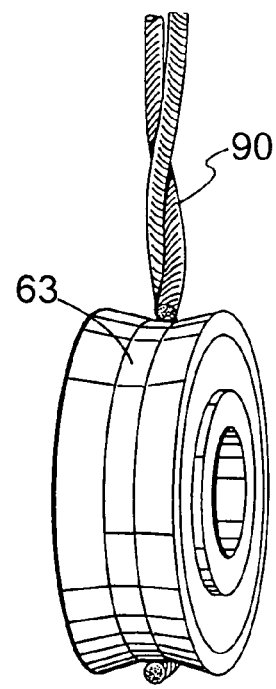
FIG. 8a shows a view of a double bearing system with a bridge having an outer surface with a wide flat-bottom V-shaped groove.
Figure 8B:
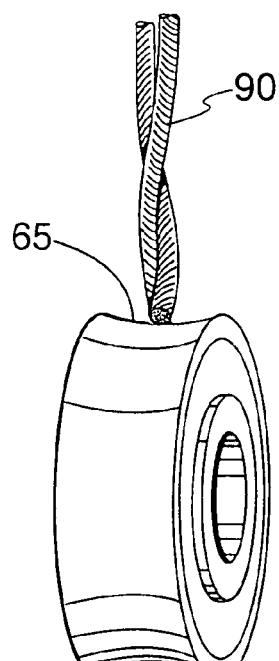
FIG. 8b shows a view of a double bearing system with a bridge having an outer surface with a continuously curved groove.
Figure 8C:
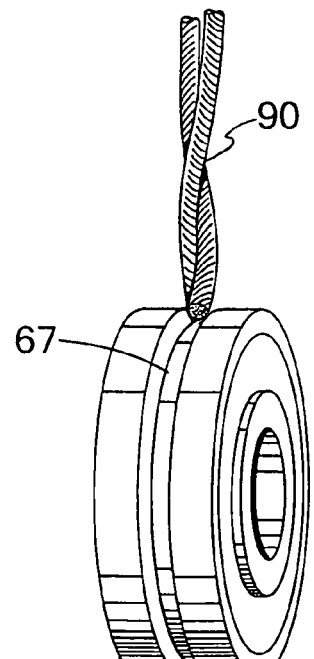
FIG. 8c shows a view of a double bearing system with a bridge having an outer surface with a narrow U-shaped groove.

The groove in the outer surface of the bridge need not be a shallow V-shape as shown in FIG. 5, but may have other angular shapes. Other angular grooves include a flat-bottom V-shape groove 63 as shown in FIG. 8a, or a narrow U-shaped groove 67, as shown in FIG. 8c. A continuously curved groove 65, such as shown in FIG. 8b, or segmented angular grooves (e.g., more complex angular variations composed of linear segments joined at various angles) could be used to create alternative string centering properties and alternative trick capabilities.

The bridge may be constructed of a range of materials including, but not limited to, plastics, metals, or woods. In preferred embodiments, the bridge would be polished metal, such as stainless steel, to provide a smooth surface for layering string during tricks and to introduce as little friction and interference with the string as possible. As with single bearing systems, double bearing systems can also take advantage of special lubricants, precision manufacturing methods, and advanced internal materials, such as ceramic balls.

Although the drawings for embodiments with a bridge show either a ring configuration with independent inner rings and independent outer rings (FIGS. 3 and 5) or a configuration with overlapping inner rings (FIGS. 7a and 7b), the bridge can also be used with double bearing configurations having one shared inner ring and one shared outer ring (FIG. 2b); with one shared inner ring and independent outer rings (FIG. 2c); with overlapping outer rings (FIG. 2f); and with both overlapping inner rings and overlapping outer rings (FIG. 2h).

Alternative combinations of construction configurations and groove shapes affect the ease or difficulty of manufacturing, costs of the bearings, and performance characteristics for different types of tricks. Simple side-by-side construction is generally the simplest and least expensive, but the addition of a bridge and string centering groove greatly improve the bearing performance and reduces the likelihood of malfunction.

While FIGS. 1-8 show numerous variations in construction and shapes, they all depict double bearings with a common feature; they all represent bearings with two tracks of bearing balls that share the weight and impact of the yo-yo as supported by the string. The different construction configurations simply represent alternative means for achieving the benefits of the double bearing design. Also, FIGS. 4-8 show several different profiles for string centering grooves, but they all share a common purpose, which is to work in concert with the double bearing design to reduce friction between the string and side walls of the yo-yo. The combinations of double bearing construction options and string-centering groove shapes all share the common design objectives of improved balance, reduced wiggles/wobbles, reduced tilting of the yo-yo, and reduced friction.

I claim:

1. A yo-yo comprising:
   a first yo-yo half body;
   a second yo-yo half body;
   an axle positioned between the two yo-yo half bodies;
   two bearings positioned side-by-side on the axle, each bearing including an outer ring with an outer surface, an inner ring, and an array of rolling elements entrapped between the inner ring and the outer ring; and
   a bridge spanning the two bearings, the bridge having an outer surface, and an inner surface in contact with the outer rings of the two bearings.

2. A yo-yo as set forth in claim 1 wherein the outer surface of the bridge includes an angular groove for centering string.

3. A yo-yo as set forth in claim 2 wherein the inner rings extend laterally outward more than the outer rings and bridge extend laterally outward.

4. A yo-yo as set forth in claim 3 wherein rings of the two bearings are integrally shared with each other.

5. A yo-yo as set forth in claim 3 wherein the bearings have overlapping rings.

6. A yo-yo as set forth in claim 2 wherein rings of the two bearings are integrally shared with each other.

7. A yo-yo as set forth in claim 2 wherein the bearings have overlapping rings.

8. A yo-yo as set forth in claim 1 wherein the inner rings extend laterally outward more than the outer rings and bridge extend laterally outward.

9. A yo-yo as set forth in claim 8 wherein rings of the two bearings are integrally shared with each other.

10. A yo-yo as set forth in claim 8 wherein the bearings have overlapping rings.

11. A yo-yo as set forth in claim 1 wherein rings of the two bearings are integrally shared with each other.

12. A yo-yo as set forth in claim 1 wherein the bearings have overlapping rings.

13. A yo-yo as set forth in claim 1 wherein the outer surface of the bridge includes a groove with continuous curvature for centering string.

14. A yo-yo comprising:
    a first yo-yo half body;
    a second yo-yo half body;
    an axle positioned between the two yo-yo half bodies;
    two bearings positioned side-by-side on the axle, each bearing including an outer ring with an outer surface, an inner ring, and an array of rolling elements entrapped between the inner ring and the outer ring; and
    a bridge spanning the two bearings, the bridge having an outer surface, and an inner surface in contact with the outer rings of the two bearings, and having an internal annular bridge-centering ridge.

15. A yo-yo as set forth in claim 14 wherein the outer surface of the bridge includes an angular groove for centering string.

16. A yo-yo as set forth in claim 15 wherein the inner rings extend laterally outward more than the outer rings and bridge extend laterally outward.

17. A yo-yo as set forth in claim 16 wherein the bearings have overlapping rings.

18. A yo-yo as set forth in claim 15 wherein the bearings have overlapping rings.

19. A yo-yo as set forth in claim 14 wherein the inner rings extend laterally outward more than the outer rings and bridge extend laterally outward.

20. A yo-yo as set forth in claim 19 wherein the bearings have overlapping rings.

21. A yo-yo as set forth in claim 14 wherein the bearings have overlapping rings.

22. A yo-yo as set forth in claim 14 wherein the outer surface of the bridge includes a groove with continuous curvature for centering string.

23. A yo-yo comprising:
    a first yo-yo half body;
    a second yo-yo half body;
    an axle positioned between the two yo-yo half bodies; and
    two bearings positioned side-by-side on the axle, each bearing including an outer ring with an outer surface, an inner ring extending laterally outward more than the outer ring extends laterally outward, and an array of rolling elements entrapped between the inner ring and the outer ring.

24. A yo-yo as set forth in claim 23 wherein the surface of the outer ring of each bearing is shaped such that the outer rings of the two bearings when side-by-side include an angular groove for centering string.

25. A yo-yo as set forth in claim 24 wherein rings of the two bearings are integrally shared with each other.

26. A yo-yo as set forth in claim 24 wherein the bearings have overlapping rings.

27. A yo-yo as set forth in claim 23 wherein rings of the two bearings are integrally shared with each other.

28. A yo-yo as set forth in claim 23 wherein the bearings have overlapping rings.

29. A yo-yo as set forth in claim 23 wherein the surface of the outer ring of each bearing is tapered such that the outer rings of the two bearings when side-by-side include a groove with continuous curvature for centering string.

* * * * *